Figure 1:
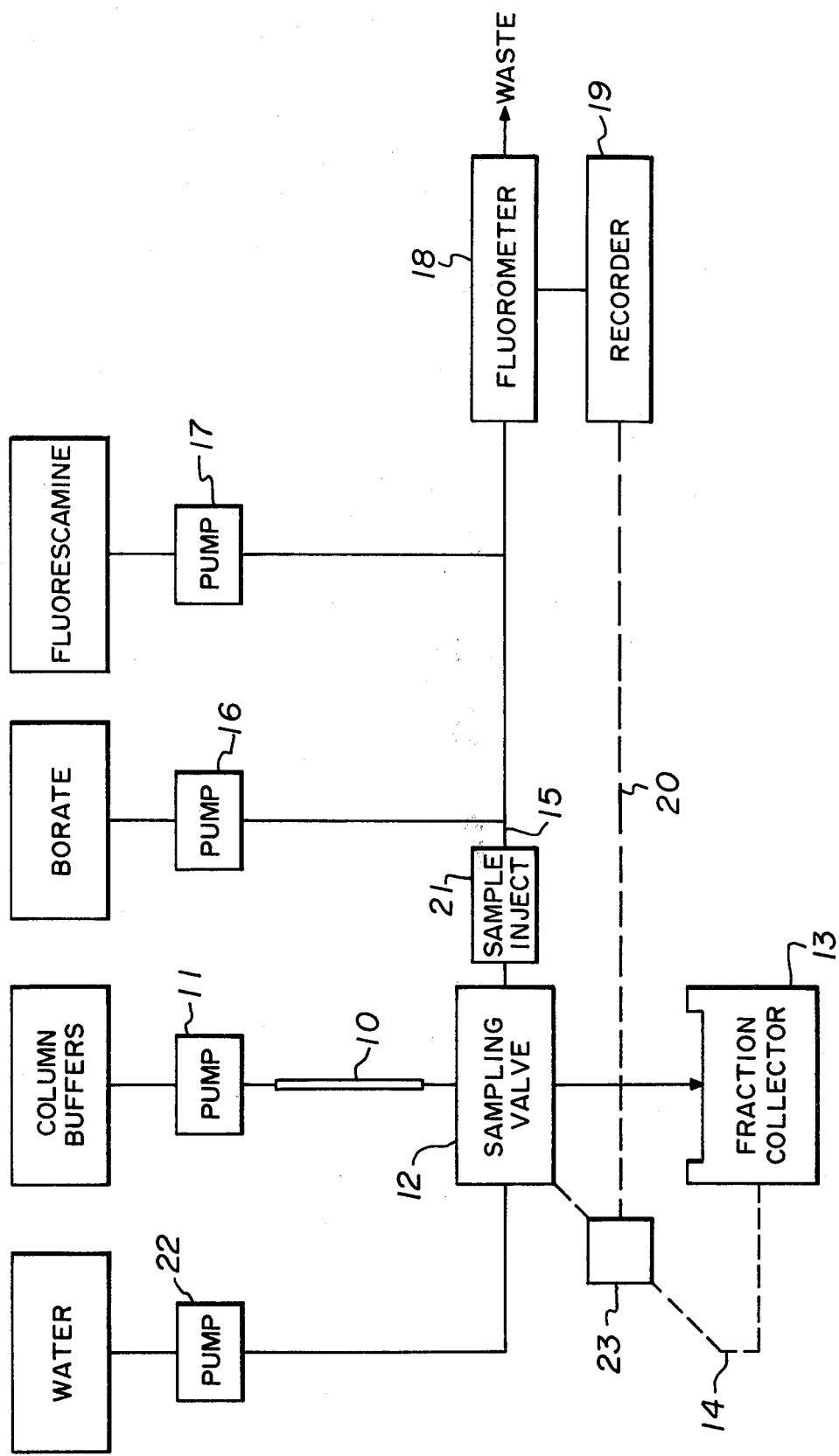

United States Patent [19]

Bohlen

[11] 3,876,881
[45] Apr. 8, 1975

[54] PROTEIN MONITOR
[75] Inventor: Peter Bohlen, San Francisco, Calif.
[73] Assignee: Hoffman-La Roche Inc., Nutley, N.J.
[22] Filed: May 16, 1974
[21] Appl. No.: 470,422

Related U.S. Application Data
[63] Continuation-in-part of Ser. No. 409,354, Oct. 24, 1973, abandoned.

[52] U.S. Cl. ............... 250/364; 250/365; 250/430; 250/461
[51] Int. Cl. ........................................... G01n 21/38
[58] Field of Search ........... 250/302, 304, 361, 363, 250/364, 365, 369, 373, 428, 430, 431, 461, 492; 137/38; 141/311; 251/120, 129, 208; 424/7

[56] References Cited
UNITED STATES PATENTS
3,657,537   4/1972   Wheeless, Jr. et al. ............. 250/302
3,699,336  10/1972   Ehrlich et al. ....................... 250/373

Primary Examiner—James W. Lawrence
Assistant Examiner—Davis L. Willis
Attorney, Agent, or Firm—Samuel L. Welt; Jon S. Saxe; George M. Gould

[57] ABSTRACT

An automatic detection system utilizing fluorescence in a highly sensitive protein assay is described. The system in one preferred embodiment employs a unique three-way valve as a stream sampler to monitor the eluate from a protein column through the detector section of the system. Protein content in the sample stream is determined by forming a fluorophor with the protein in the sample using a newly developed class of fluorogens which react with the primary amine groups of the protein. The resultant fluorescence is measured in a fluorometer and is proportional to the protein content in the sample. In a preferred mode of operation the stream sample valve is guided by a timer so that when the fraction collector reaches a midpoint of filling a tube, the sample valve indexes and a small volume of the column eluate is withdrawn into the detector section of the system.

7 Claims, 2 Drawing Figures

3,876,881

PROTEIN MONITOR

RELATED APPLICATIONS

This application is a continuation-in-part of copending application Ser. No. 409,354, filed Oct. 24, 1973 and now abandoned.

BACKGROUND OF THE INVENTION

There are several techniques currently employed for the assay of protein. One such technique involves direct monitoring of protein in column eluates by means of measurement of ultraviolet absorbance, e.g., at 280 nm. This technique has advantages in its convenience and simplicity of handling. Such advantages reside in part in the fact that the detection of protein content by ultraviolet absorbance measurement does not alter the sample stream in any way. Thus, the whole column eluent can be continuously monitored. However, the ultraviolet detection system does have the serious disadvantage that it has relatively poor sensitivity.

The Lowry method is another widely used assay procedure for discrete protein samples. This method has been adapted for the automatic determination of protein in a flow system and has been found to give good sensitivity. However, the Lowry method also has its disadvantages particularly in the apparatus utilized to practice it. Such apparatus is quite complicated and requires heating baths, time delay coils, etc. Since the Lowry method causes chemical alteration of the protein sample it is necessary to utilize a stream splitter which directs a small portion of the column eluate into the detection system.

DESCRIPTION OF THE INVENTION

The present invention relates to an improved apparatus for automatically assaying the protein content of an eluent from a protein separating means, usually a chromatographic column. The eluent, containing the separated components of the original sample of varying protein content, is directed through a multi-positional sampling valve into a fraction collector. This multi-positional sampling valve is indexed by a timer signal which can be initiated by a signal derived from the fraction collector when it indexes or generated internally in the timer. Thus, when the fraction collector indexes, for example, when a predetermined volume has been collected, a signal is generated by the fraction collector to a timer. After a predetermined delay, the timer generates a signal for the sampling valve to index. The period of delay will be such so that the indexing of the sample valve occurs at the mid-point of the collection of the sample in a single tube of the fraction collector. In this way, the sample collected is representative of the protein content of the fraction collector tube which is being filled. It would further be within the scope of the invention to provide for a number of timer signals within a single tube filling or alternatively to provide for sampling of only a select number of tubes out of the total collected. Such modifications are accomplished by selecting the appropriate time delay and response to signal ratios in the timer.

It is also within the scope of this invention to utilize the apparatus without a fraction collector. In such use period signals are generated by the timer and will cause indexing of the sampling valve. The eluent passing through the sampling valve can be collected or disabled at the option of the operator.

The detection system utilized in the apparatus of this invention employs fluorescence to determine the protein content of the eluent sample. This is accomplished by adding a solution of a fluorogen compound to the eluent sample after prior addition of a suitable buffer so as to form a fluorophor with the protein in the sample. The resultant fluorescence is then measured in a fluorometer means such as a spectrofluorometer or a filter fluorometer equipped with flow cells, and such fluorescence will be proportional to the protein content in the sample provided that the protein concentration is not too large as to cause quenching. This signal is displayed in graphic form as a series of peaks in a conventional recorder. Each peak area, when middle of the tube sampling has been done, will correspond to the amount of protein in the corresponding sample and the test tube of the fraction collector from which the sample was diverted. Integration of the peak area thus indicates directly how much protein is in specific test tube of the fraction collector.

Suitable fluorogens useful for determining protein content in the present detection system include the 4-(substituted)-spiro[furan-2(3H),1'-phthalan]-3,3'-diones described in United States Patent Application Ser. No. 212,790, filed Dec. 27, 1974 now U.S. Pat. No. 3,812,181 issued May 21, 1974, inventors Leimgruber and Weigele and entitled "Fluorometric Reagents and Methods."

Figure 2:
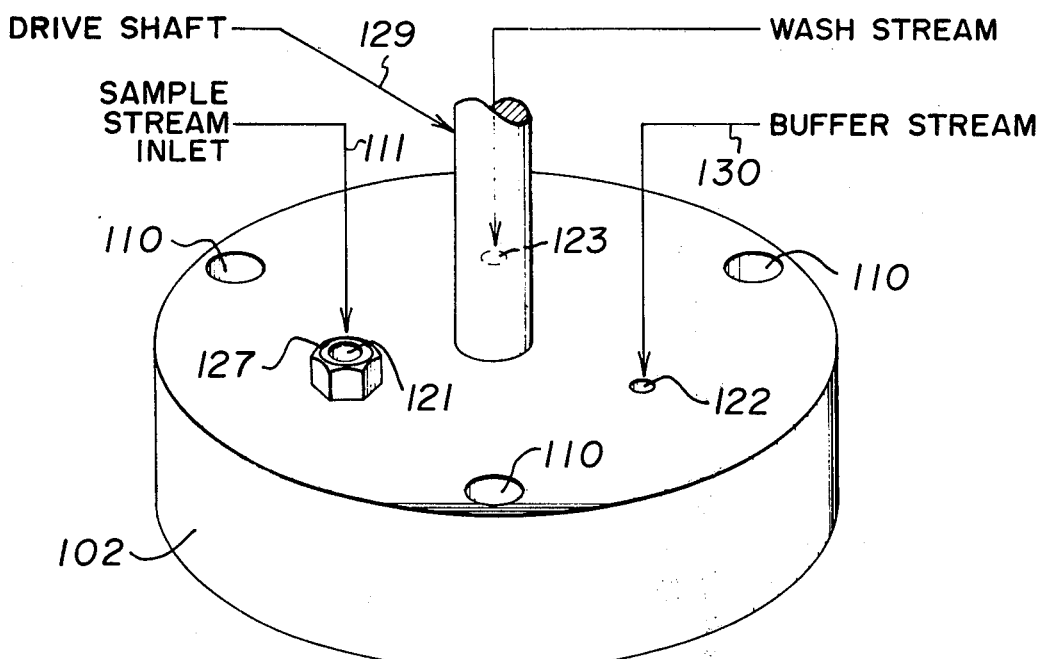
Figure 2:
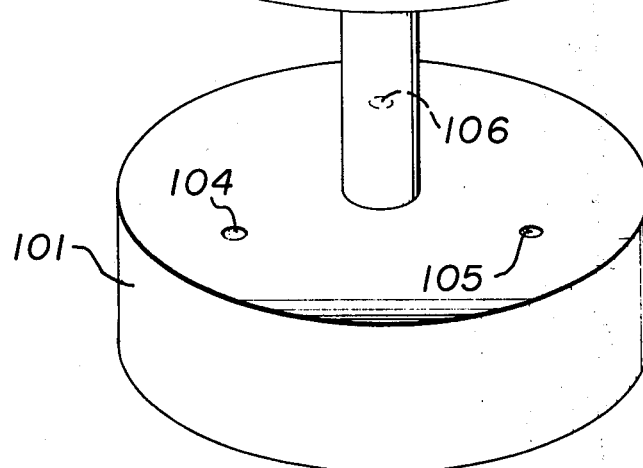
Figure 2:
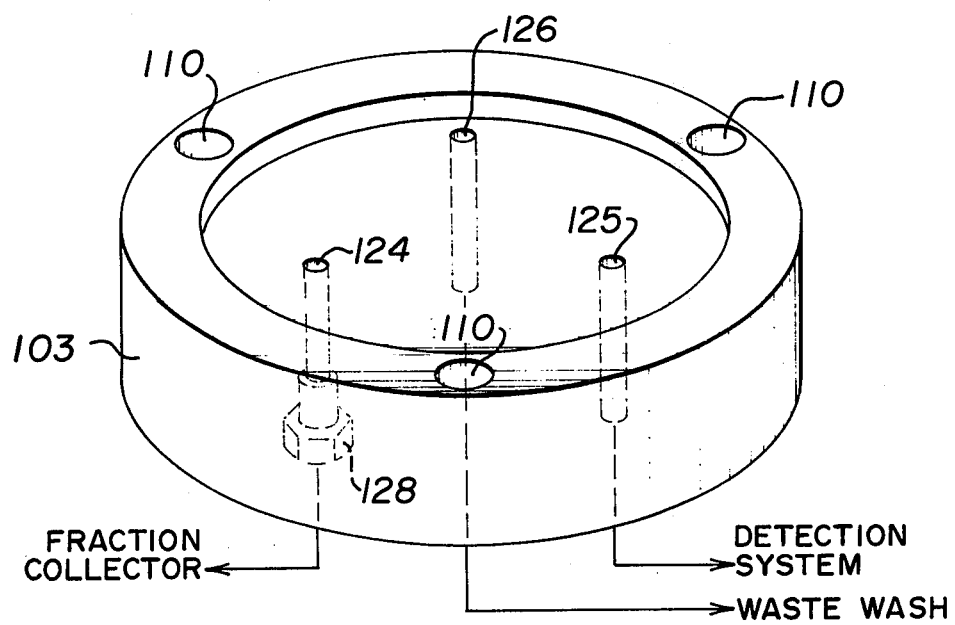

The apparatus of the present invention can be more clearly understood by reference to the accompanying Drawing in which FIG. 1 represents a schematic view of the protein analyzer of the present invention while FIG. 2 details the structure of a preferred embodiment of the sampling valve means.

Turning first to FIG. 1, a protein separation means 10 such as a chromatographic gel filtration or ion exchange column containing conventional gel filtration or ion exchange materials is loaded with a protein sample and then eluted with suitable buffers by means of pump 11. The column eluate then flows through a multi-positional sampling valve means 12.

In one aspect of the invention this multi-positional sampling valve means will comprise two conventional two-position four-way valves formed into a stream sampling valve. Such stream sampling valve is an article of commerce. In the first position this valve will allow the column eluent to pass directly to an outlet means which in the described embodiment is automatic fraction collector means 13. Initiation of indexing of the automatic fraction collector means 13 generates a signal which is transmitted to a timer 23. After a preselected time delay to coincide with the midpoint of the filling of a tube in the fraction collector, the timer generates a signal to sampling valve means 12 via electrical signal conducting means 14, e.g., copper wire. This signal causes the sampling valve to index to its second position wherein a portion of the column eluent is directed into a water or buffer stream provided by pump 22 which stream then is led to the detection system by means of liquid conductor means 15 which can be a suitable plastic or stainless steel tubing. The proportion of column eluent passed to the detection system need be only a small portion of the total eluent stream as the fluorescence detection system has a high sensitivity.

The amount of sample is variable and is dependent on the volume utilized in the sampling valve. Generally, sample amounts in the range of 5 to 50 µl. may be employed.

The eluent sample in liquid conductor means 15 is mixed with desired buffer solution such as, for example, phosphate or borate buffer, at pH 8–9, introduced by means of pump 16 and then with the fluorogen solution introduced by means of pump 17. Reaction of the fluorogen with the primary amino groups of the protein in the sample results in the formation of fluorescent products. The amount of fluorescence is determined by fluorometer means 18, e.g., a commercial fluorometer equipped with a flow cell for continuous measurement in a conventional manner. The output signal from fluorometer means 18 can be displayed most conveniently in graphic form utilizing recorder 19. Correlation of the output signal from the fluorometer and the fraction being tested can be obtained by introducing a signal from timer 23 into recorder 19 by means of electrical signal conducting means 20.

When the system of the invention is operated in the manner hereinbefore described, the recorder will produce a series of peaks. The area of each peak will be directly proportional to the amount of protein contained in the corresponding fraction collected from the column eluent. Quantitative determinations of protein content in each fraction are readily obtained by comparison to peak values obtained from standard protein solutions.

In an optional mode, the system can be modified by introducing sample injection valve 21 into a convenient point in the apparatus such as in liquid conductor means 15. Thus, if this mode is employed, external protein samples may be directly introduced into the detection system of the apparatus for assay or standard protein solutions can be introduced for standardization of the assay system.

In a further aspect of the present invention representing a preferred embodiment thereof, a three-position rotary valve of novel design is employed as the sampling valve means. For this embodiment the system shown in FIG. 1 is modified by linking the outlet of pump 16 into sampling valve 12 rather than into liquid conductor means 15.

In FIG. 2 the aforesaid three-position rotary valve is shown in detail. This valve consists of a rotating cylindrical plate 101 rotatably mounted and clamped tightly between an upper fixed plate 102 and a lower fixed plate 103. The plates may be constructed out of conventional materials such as polyfluorinated ethylene plastic, e.g., Teflon, a trademark of E.I. DuPont De Nemours and Co., or stainless steel, for example. Most preferably, the rotating plate is made of one of the aforesaid types of materials and the fixed plates are made of the other type.

Cylindrical plate 101 contains three channels 104, 105 and 106 bored through its longitudinal axis and preferably disposed symmetrically around the center axis at an angle of 120° from each other. Both the upper and lower fixed plates each contain three correspondingly placed channels at positions 121, 122, 123, 124, 125 and 126 as seen in FIG. 2. These channels are arranged in such position as to index with channels 104, 105 or 106 as cylindrical plate rotates around its longitudinal axis so as to provide continuous liquid flow streams through the three plates.

The surfaces between the fixed plates and cylindrical plate 101 are machined to a smooth low friction finish to minimize friction and facilitate rotation of cylindrical plate 101. Moreover, when the three plates are clamped tightly together these surfaces provide a liquid tight seal to prevent leakage of liquid between channels and plates. The fixed plates can be clamped together by using screws or other means of clamping using appropriate holes in the fixed plates at 110 to provide pressure between the various plates and improve the seal particularly when the fixed plates and the rotating plate are constructed of different materials such as plastic and stainless steel. Such clamping does not prevent the rotation of cylindrical plate 101. To facilitate clamping the diameter of the fixed plates 102 and 103 should be somewhat greater than the diameter of the rotating cylindrical plate 101.

During operation of the analyzer column, eluent passes through channel 104, entering through inlet 111 and channel 121 via plastic connector 127 in upper plate 102 and exiting through outlet channel 124 via connector 128 to the fraction collector. Both inlet channel 121 and outlet channel 124 are in direct flow relationship with channel 104 in this portion of the operating cycle.

At a desired, predetermined point in the fraction collection cycle, the timer generates a signal as discussed above causing rotation of cylindrical plate 101 by means of a stepping motor (not shown) and drive shaft 129 which passes through a suitable hole in plate 102 and is connected to plate 101. When a 120° stepping motor is employed, rotation of plate 101 occurs in an arc of 120° which thereby places channel 104 in connective relation with channel 122 of top plate 102 and channel 125 of bottom plate 103. The rotation from the first discussed position causes the trapping and transfer of a volume of the column eluent within the said channel 104.

In the second position in the cycle, buffer solution utilized in the fluorescence reaction enters through inlet means 130 and washes out the column eluent sample in channel 104 through outlet channel 125 into the detection system.

The next indexing signal from the timer causes another 120° rotation of cylindrical plate 101. At this point in the cycle channel 104 is in direct flow relationship with inlet channel 123 in top plate 102 and outlet channel 126 in bottom plate 103. Water passes through channel 104 in this position which serves to ensure that the channel is free of any residual column eluent sample when channel 104 returns to its initial position. This wash step prevents contamination of the collected sample with buffer and the following samples with prior ones. The wash water after exiting through outlet channel 126 passes to waste.

On the next indexing signal from the fraction collector, channel 104 is rotated the last 120° in the cycle to return to its original position, that is, in direct flow relation with channels 121 and 124.

It is understood, of course, that channels 105 and 106 will follow the sample cycle as channel 104 except that they are 240° and 120° out of phase, respectively, with channel 104. Thus, when channel 104 is in position to pass column eluent then channel 106 is passing wash water and channel 105 is passing buffer solution.

It is within the skill of the art to provide alternate system embodiments which could use additional numbers of channels in each of the aforesaid plates and to correspondingly utilize stepping motors of varying degrees of step. Thus, for example, plates having 24 symmetrically placed channels can be employed with a 15° stepping motor.

All liquid streams utilized in the analyzer of the instant invention are provided from individual reservoirs in conventional manner.

The amount of sample trapped and transferred by each indexing of the sample valve is, of course, a variable dependent on the volume of the sample channels. For example, the sample volume in the preferred embodiment can be varied readily by varying either or both of the length or diameter of the sample channels in plate 101.

It is within the skill of the art to make minor modifications of the protein monitor of the present invention such as by introducing alternate types of valves in conjunction with suitable modifications of the system design without departing from the spirit of this invention.

While only connectors 128 and 129 have been shown in FIG. 2, it is understood that similar connectors can be used in each of the channels in the upper and lower plates therein.

I claim:

1. A protein monitor comprising in combination:
A. sample valve means having a plurality of operating modes and operatively connected to an inlet means for a protein containing stream;
B. outlet means operatively connected to said sample valve means wherein in one operating mode said protein containing stream passes from said sample valve means to said outlet means, and wherein a timer means transmits an electrical signal to said sample valve means, said signal causing said sample valve means to index to another operating mode wherein a portion of said protein containing stream is diverted as a sample stream; and
C. fluorescence detection system means operatively connected to said sampling valve means, said fluorescence detection system comprising (i) buffer inlet means; (ii) fluorogen compound inlet means; (iii) fluorometer means; and (iv) recorder means, whereby said sample stream from said sample valve means is mixed with said buffer and said fluorogen compound so as to produce a fluorophor with the protein contained in said sample stream, the fluorescence of said fluorophor is measured by said fluorometer means and this measured fluorescence corresponding to the protein content of said sample stream is displayed graphically by said recorder means.

2. The protein monitor of claim 1 wherein said timer means is operatively connected to a fraction collector means and sample valve means, wherein the signal generated by said fraction collector means on indexing is delayed for a predetermined period and then transmitted to said sample valve means.

3. The protein monitor of claim 1 wherein a sample injection valve means is introduced between said sample valve means and said fluorescence detection system.

4. The protein monitor of claim 2 wherein said sample valve means is two two-position four way valves wherein in one operating mode, said protein containing stream passes directly to said fraction collection means and in a second operating mode a wash stream passes through said sample valve means carrying said diverted sample stream to said fluorescence detection system means.

5. The protein monitor of claim 1 wherein said sample valve means is a multi-position valve comprising (a) a cylindrical plate containing a plurality of channels bored parallel to its longitudinal axis, said channels being symmetrically disposed around the center axis of said cylindrical plate; (b) an upper and lower fixed plate between which said cylindrical plate is rotatably mounted, said upper plate and said lower plate each containing the same plurality of channels symmetrically disposed around their respective center axis so that such channels are in operative relation with the corresponding channels in said cylindrical plate, wherein at least one of said channels in said upper plate is operatively connected with the inlet means for said protein containing stream and the corresponding channel in the lower plate is operatively connected with said fraction collector means, wherein at least one other of said channels in said upper plate is operatively connected with said buffer inlet means and the corresponding channel in the lower plate is operatively connected with said fluorescence detection system and wherein at least one other of said channels in said upper plate is operatively connected with a water inlet means and the corresponding channel in said lower plate is operatively connected to waste; whereby a signal from said timer means causes rotation of said cylindrical plate relative to said upper and lower plates with concomitant entrappment of any liquid streams contained in said channels and transport of said entrapped streams to the next position of said cylindrical plate.

6. The protein monitor of claim 5 wherein said cylindrical plate is operatively connected to a stepping motor which steps proportionately to the number of channels in each said cylindrical, upper and lower plates.

7. The protein monitor of claim 6 wherein said stepping motor steps 120° and there are three channels in each said cylindrical, upper and lower plates.

* * * * *